(12) United States Patent
Park et al.

(10) Patent No.: US 8,717,784 B2
(45) Date of Patent: May 6, 2014

(54) CONTROL CIRCUIT OF LLC RESONANT CONVERTER AND LLC RESONANT CONVERTER USING THE SAME

(75) Inventors: Sang Gab Park, Suwon-si (KR); Nam Jin Park, Suwon-si (KR); Han Hee Lee, Suwon-si (KR); Hyo Joong An, Suwon-si (KR); Gyu Min Park, Suwon-si (KR); Heung Gyoon Choi, Suwon-si (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 102 days.

(21) Appl. No.: 13/309,310

(22) Filed: Dec. 1, 2011

(65) Prior Publication Data
US 2012/0163038 A1 Jun. 28, 2012

(30) Foreign Application Priority Data

Dec. 22, 2010 (KR) .................. 10-2010-0132496

(51) Int. Cl.
*H02M 3/335* (2006.01)
(52) U.S. Cl.
USPC ...................................... 363/21.02
(58) Field of Classification Search
USPC ............ 363/15, 16, 21.02, 21.03, 39, 40, 41, 363/131
See application file for complete search history.

(56) References Cited

U.S. PATENT DOCUMENTS

| 6,297,976 | B1 | 10/2001 | Isono |
| 6,344,979 | B1 | 2/2002 | Huang et al. |
| 7,848,117 | B2 * | 12/2010 | Reinberger et al. ............. 363/16 |
| 7,885,085 | B2 * | 2/2011 | Orr et al. .................... 363/21.02 |
| 8,014,172 | B2 * | 9/2011 | Reinberger et al. ............. 363/16 |
| 8,102,164 | B2 * | 1/2012 | Colbeck et al. ............... 323/282 |
| 8,134,851 | B2 * | 3/2012 | Soldano et al. ............... 363/127 |
| 8,248,051 | B2 * | 8/2012 | Colbeck et al. ............... 323/282 |
| 8,274,799 | B2 * | 9/2012 | Reinberger et al. ............. 363/13 |
| 8,284,571 | B2 * | 10/2012 | Colbeck et al. ............ 363/21.02 |
| 8,300,429 | B2 * | 10/2012 | Orr et al. .................... 363/21.02 |
| 2012/0063175 | A1 * | 3/2012 | Wang et al. ................. 363/21.14 |

FOREIGN PATENT DOCUMENTS

| KR | 10-2006-0014102 A | 2/2006 |
| KR | 1020060014102 | 2/2006 |

OTHER PUBLICATIONS

Kim, Cher I-Jin, et al.; "A Study on the LLC Resonant Converter with Power Factor Correction"; Jul. 2010; pp. 1011-1013 (with Abstract).

* cited by examiner

*Primary Examiner* — Adolf Berhane
(74) *Attorney, Agent, or Firm* — Bracewell & Giuliani LLP; Brad Y. Chin

(57) ABSTRACT

The present invention provides a control circuit of an LLC resonant converter including a minimum switching frequency variable circuit of varying a minimum switching frequency corresponding to an AC input voltage of the LLC resonant converter; and a first pulse signal generating unit and a second pulse signal generating unit to generate a first pulse signal and a second pulse signal based on a switching frequency limited by the minimum switching frequency variable circuit.

19 Claims, 8 Drawing Sheets

CONTROL CIRCUIT OF LLC RESONANT CONVERTER AND LLC RESONANT CONVERTER USING THE SAME

CROSS REFERENCE TO RELATED APPLICATION

This application claims the benefit under 35 U.S.C. Section 119 of Korean Patent Application Serial No. 10-2010-0132496, entitled filed Dec. 22, 2010, which is hereby incorporated by reference in its entirety into this application.

BACKGROUND OF THE INVENTION

1. Field of the Invention

The present invention relates to a control circuit of an LLC resonant converter and an LLC resonant converter using the same, and more particularly, to a control circuit of an LLC resonant converter capable of obtaining a desired input/output DC voltage gain with corresponding to a variable AC input voltage and varying a minimum switching frequency without an active power factor correction and an LLC resonant converter using the same.

2. Description of the Related Art

Recently, according to the development of multimedia technology, there have been drastically developed in the technology field for the image and audio using a home theater system.

Particularly, in the audio part, there are many efforts to make sounds to be more realistic. From the computer sound which plays only simple rhythm, there are needs of functions capable of playing the sound of person, various sound effects and the sound being near at the original sound and the sound capable of producing more spectacular and realistic atmosphere.

The sound started from a mono-sound has been now developed to a 3D sound technology capable of a feeling similar to a real world deviated from a simple 2D sound. And, as being developed from a speaker environment of 2 channels to a virtual surround technology capable of reproducing the sound of 4 channels or 5.1 channels, there has been a trend that the interests for a dual power supply and power consumption are increased.

According to such trend, it is needed to a technology development for the miniaturization and slim of the power supply system, a high efficiency/high performance and an improvement of price competitiveness.

FIG. 1 is a diagram showing a conventional fly-back converter, and FIG. 2 is a diagram showing main operational waveforms of the conventional fly-back converter shown in FIG. 1. As the fly-back converter is an insulating type of a Buck-Boost converter, main operations and a converting ratio between input and output voltages are equal to those of the Buck-Boost converter except a transformer turn ratio, if the transformer turn ratio is defined $N=(N_P/N_S)$, an input and output relationship becomes as follows:

$$M = \frac{V_O}{V_{in}} = \frac{D}{(1-D)}n$$

A structure of the fly-back converter is very simple as shown in FIG. 1, since a transformer reset is automatically implemented by the output voltage; it is adapt to construct medium-sized low-cost power supply without requiring an additional reset circuit.

However, as shown in FIG. 2, the voltage shift stresses of the switch and output diode are very large as $V_{in}+NV_O$ and $V_{in}/N+V_O$ respectively, as well as, due to the energy stored at the transformer leakage inductor $L_{lkg}$ during turn-off, a critical voltage ringing is generated at both ends of the switch, in this result, there is a problem to require an additional Snubber circuit for absorbing this.

Meanwhile, since the magnetizing current of the transformer has an offset of a load current size, the transformer utilization is low, when the operational frequency is high and the load capacitance is large, an additional auxiliary circuit must be added for a soft switching, there is a shortcoming that the output voltage has a large riffle since the output current is discontinuous.

Specifically, as described the above, since the output diode has the very large voltage stress as $V_{in}+NV_O$ as well as by the resonance between the transformer leakage inductor $L_{lkg}$ and the output diode junction capacitor the large voltage ringing is added to this, the expensive diode having high withstanding voltage must be used and the Snubber circuit or the like must be included. Accordingly, there are problems that the manufacturing cost of the system is increased and the efficiency is deteriorated, in case when a high output voltage is required, such problems are more deepened.

SUMMARY OF THE INVENTION

The present invention has been invented in order to overcome the above-described problems and it is, therefore, an object of the present invention to provide a control circuit of an LLC resonant converter capable of obtaining a desired input/output DC voltage gain with corresponding to a variable AC input voltage and varying a minimum switching frequency without an active power factor correction and an LLC resonant converter using the same.

In accordance with one aspect of the present invention to achieve the object, there is provided a control circuit of an LLC resonant converter including a minimum switching frequency variable circuit of varying a minimum switching frequency corresponding to an AC input voltage of the LLC resonant converter and a first pulse signal generating unit and a second pulse signal generating unit to generate a first pulse signal and a second pulse signal based on a switching frequency limited by the minimum switching frequency variable circuit.

Further, the minimum switching frequency variable circuit includes a minimum switching frequency adjustable transistor to operate corresponding to an AC input voltage of the LLC resonant converter, and a time constant of the minimum switching frequency variable circuit is varied according to an operation of the minimum switching frequency adjustable transistor together with a switching capacitor and a switching resistor.

Further, the minimum switching frequency variable circuit includes the minimum switching frequency adjustable transistor, a reference resistor connected to the minimum switching frequency adjustable transistor in series, a switching resistor connected to the minimum switching frequency adjustable transistor and the reference resistor in parallel and a switching capacitor connected to the switching resistor in parallel.

Further, corresponding to the AC input voltage of the LLC resonant converter, when the minimum switching frequency adjustable transistor is ON, the time constant becomes $$[(R_{ref} + R_{trans}) // R_{osc}]C_{osc} = \frac{(R_{ref} + R_{trans})R_{osc}}{R_{ref} + R_{trans} + R_{osc}}C_{osc},$$

corresponding to an AC input voltage of the LLC resonant converter, when the minimum switching frequency adjustable transistor is OFF, the time constant become $$R_{OSC}C_{OS},$$

and wherein the Rref is a resistance value of the reference resistor Rref, the Rtrans is a resistance value of an equivalent resistor of the minimum switching frequency adjustable transistor Qr during the operation of the minimum switching frequency adjustable transistor Qr, the $R_{OSC}$ is a resistance value of the switching resistor $R_{OSC}$, and the $C_{OSC}$ is a capacitance of the switching capacitor $C_{OSC}$.

Further, the minimum switching frequency adjustable transistor includes a first input resistor and a second input resistor and an AC input voltage of the LLC resonant converter is voltage dropped by the first input resistor and the second input resistor and applied to a base terminal of the minimum switching frequency adjustable transistor.

Further, wherein the first pulse signal generating unit and the second pulse signal generating unit generate the first pulse signal and the second pulse signal, alternately.

Further, the first pulse signal generating unit and the second pulse signal generating unit set a dead time between the first pulse signal and the second pulse signal not to allow the first pulse signal and the second pulse signal to become high at the same time.

Further, the minimum switching frequency variable circuit further includes a third input resistor provided with one end located between the first input resistor and the second input resistor and the other end connected to a base terminal of the minimum switching frequency adjustable transistor.

Further, the minimum switching frequency variable circuit includes a switching capacitor and a variable resistor for varying corresponding to an AC input voltage of the LLC resonant converter to vary a time constant of the minimum switching frequency variable circuit.

In accordance with another aspect of the present invention to achieve the object, there is provided an LLC resonant converter provided with a first switching transistor, a second switching transistor, a transforming unit, a rectifying unit and a control circuit of the LLC resonant converter, including: the control circuit of the LLC resonant converter includes a minimum switching frequency variable circuit of varying a minimum switching frequency corresponding to an AC input voltage of the LLC resonant converter; and a first pulse signal generating unit and a second pulse signal generating unit to generate a first pulse signal and a second pulse signal based on a switching frequency limited by the minimum switching frequency variable circuit, wherein the first pulse signal and the second pulse signal are applied to the first switching transistor and the second switching transistor.

Further, it is preferable that the first pulse signal and the second pulse signal are applied to a gate terminal of the first switching transistor and a gate terminal of the second switching transistor.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
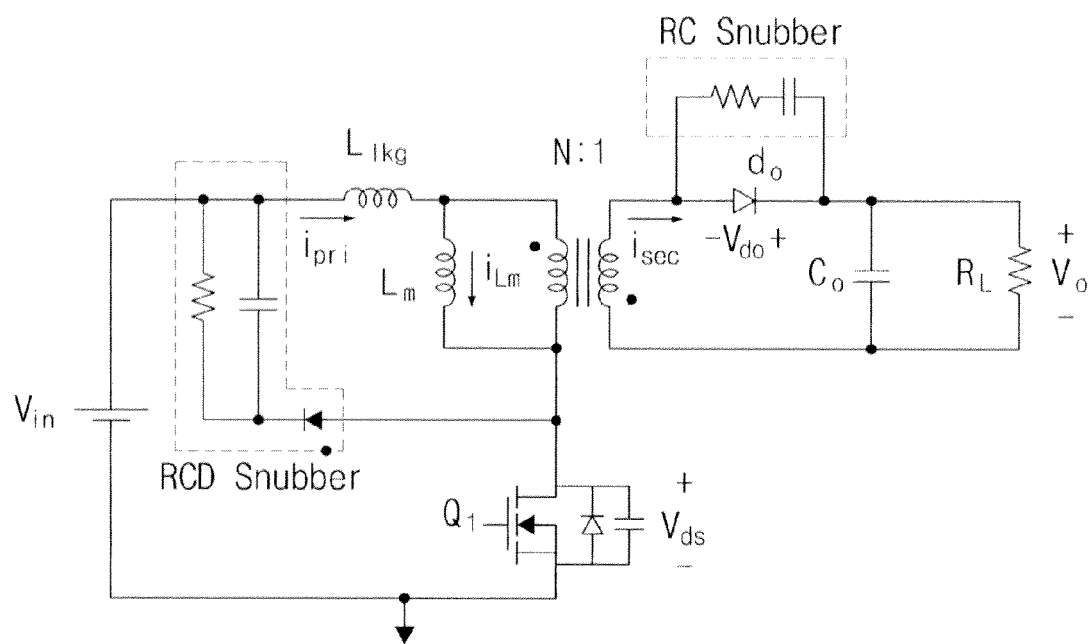
FIG. 1 is a diagram showing a conventional fly-back converter.
Figure 2:
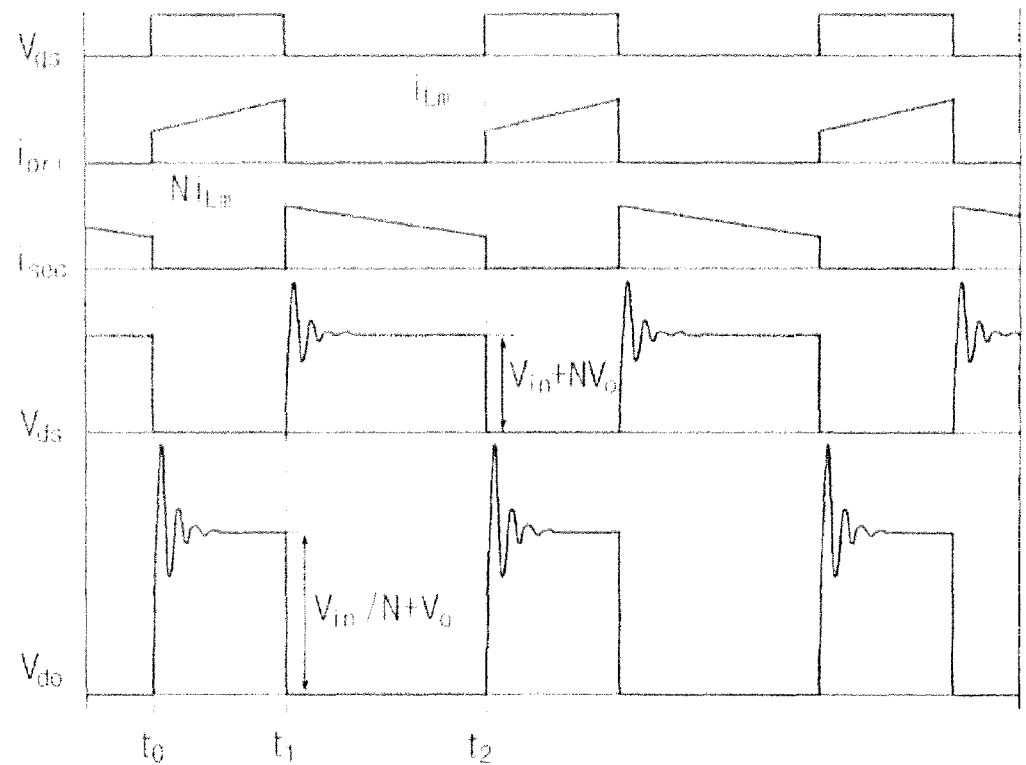
FIG. 2 is a diagram showing main operational waveforms of the conventional fly-back converter shown in FIG. 1.

Hereinafter, embodiments of the present invention will be described in detail with reference to the accompanying drawings. The following embodiments are provided as examples to fully convey the spirit of the invention to those skilled in the art.

Therefore, the present invention should not be construed as limited to the embodiments set forth herein and may be embodied in different forms. And, the size and the thickness of an apparatus may be overdrawn in the drawings for the convenience of explanation. The same components are represented by the same reference numerals hereinafter.

Figure 3:
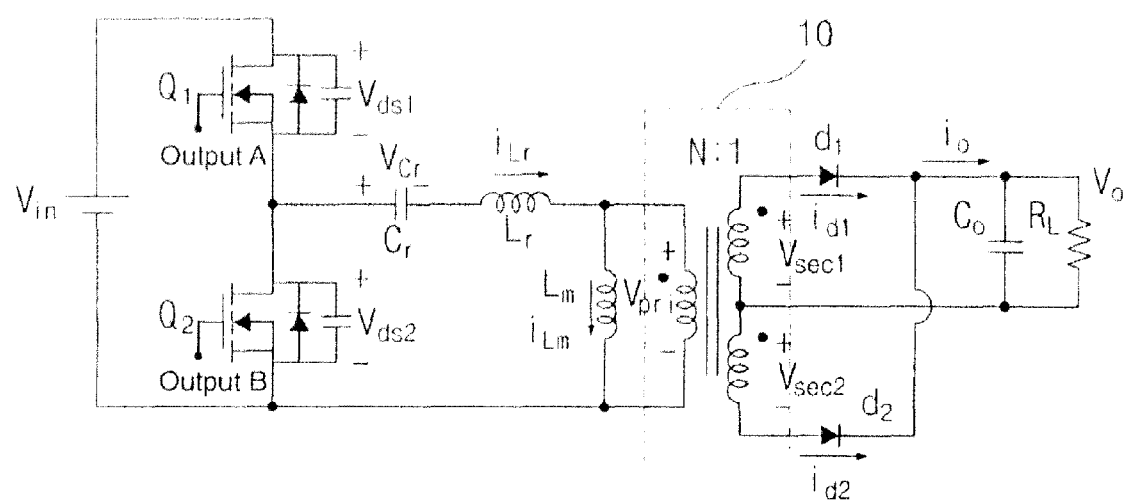
FIG. 3 is a diagram showing one example of an LLC resonant converter in accordance with one embodiment of the present invention.
Figure 4:
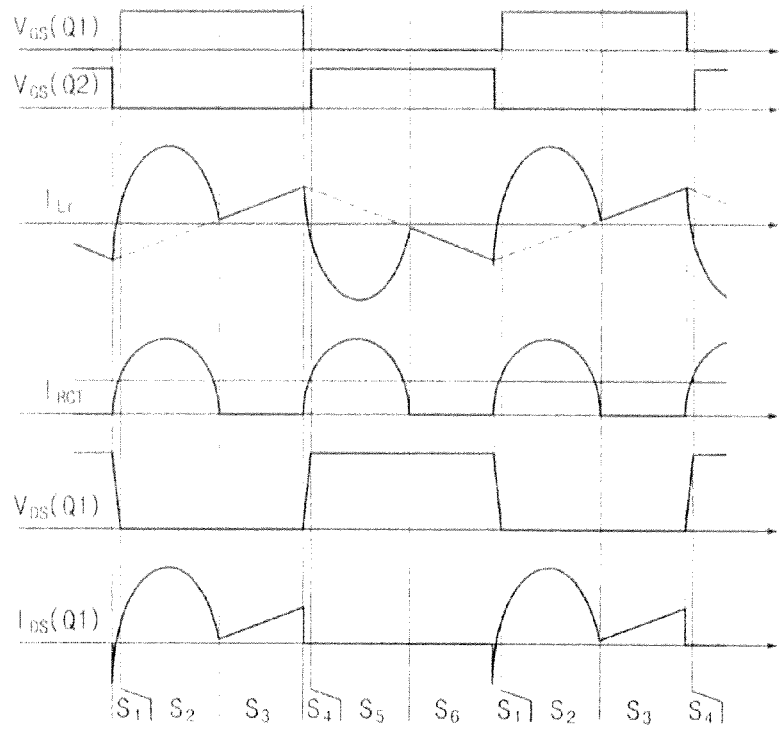
FIG. 4 is a diagram showing main operational waveforms at the circuit of FIG. 3.
Figure 5:
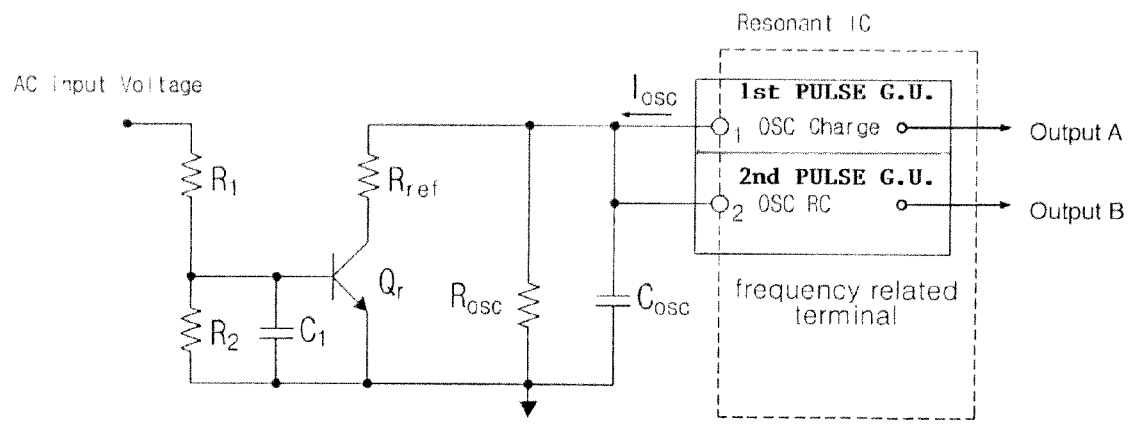
FIG. 5 is a diagram showing one example of a control circuit of the LLC resonant converter in accordance with the embodiment of the present invention.
Figure 6A:
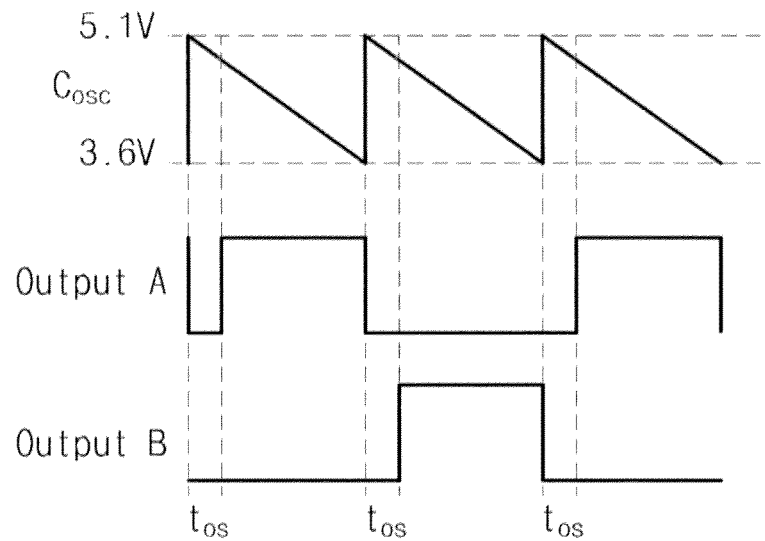
FIG. 6a and FIG. 6b are diagrams showing voltage waveforms of switching capacitor ($C_{OSC}$) of the LLC resonant converter of FIG. 5, each of when AC input voltages of the LLC resonant converter are low and high, and waveforms of a pulse signal (Output A) generated at a first pulse signal generating unit and a second pulse signal (Output B) generated at a second pulse signal generating unit.
Figure 6B:
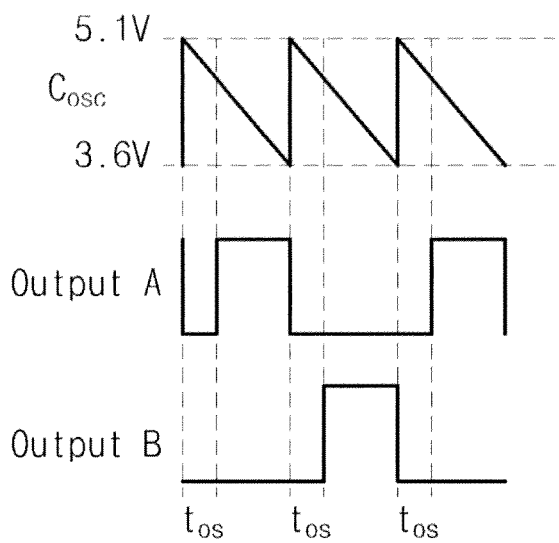
Figure 7:
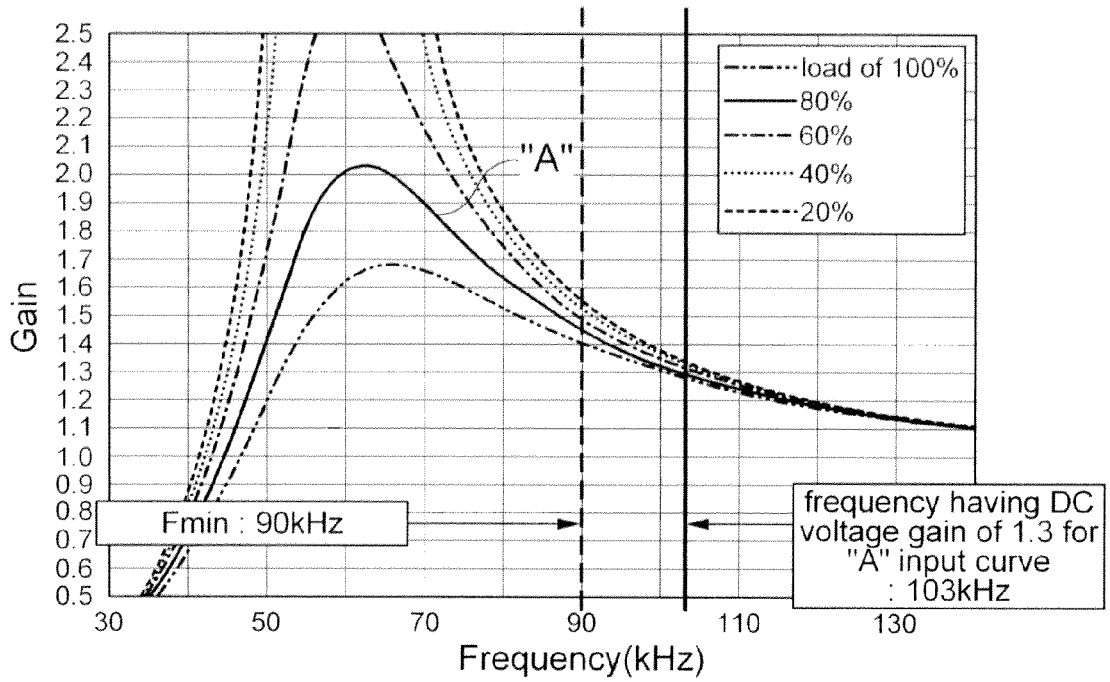
FIG. 7 is a diagram showing a DC voltage gain curve according to a switching frequency when an AC input voltage of the LLC resonant converter is high.
Figure 8:
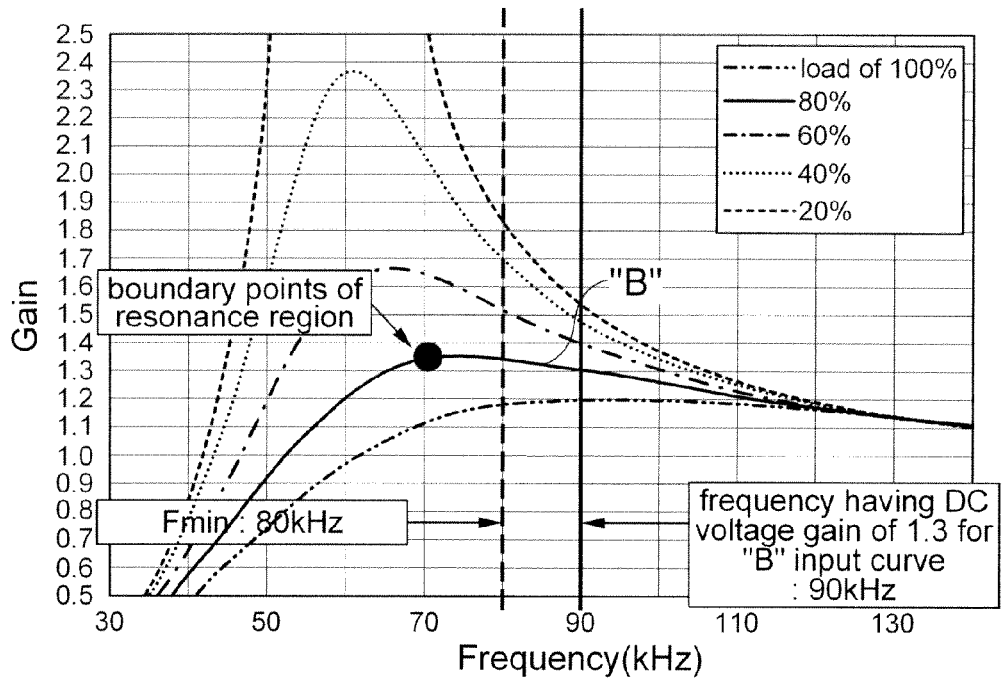
FIG. 8 is a diagram showing a DC voltage gain curve according to a switching frequency when an AC input voltage of the LLC resonant converter is low.
Figure 9:
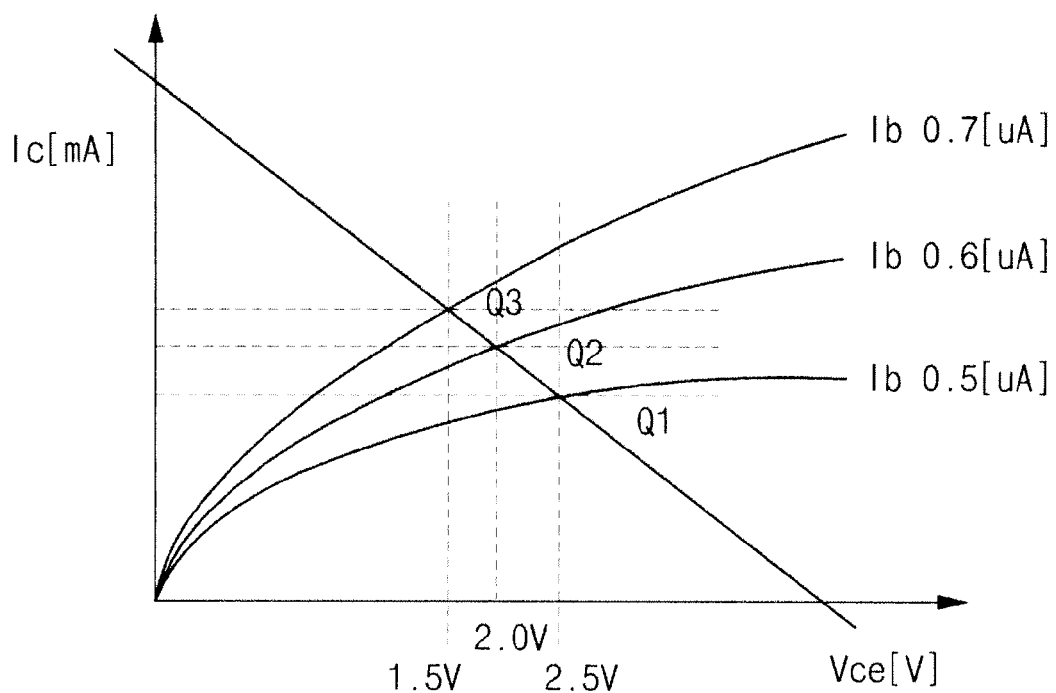
FIG. 9 is a diagram showing output characteristics of a minimum switching frequency adjustable transistor according to a minimum switching frequency adjustable transistor base current of the LLC resonant converter.
Figure 10A:
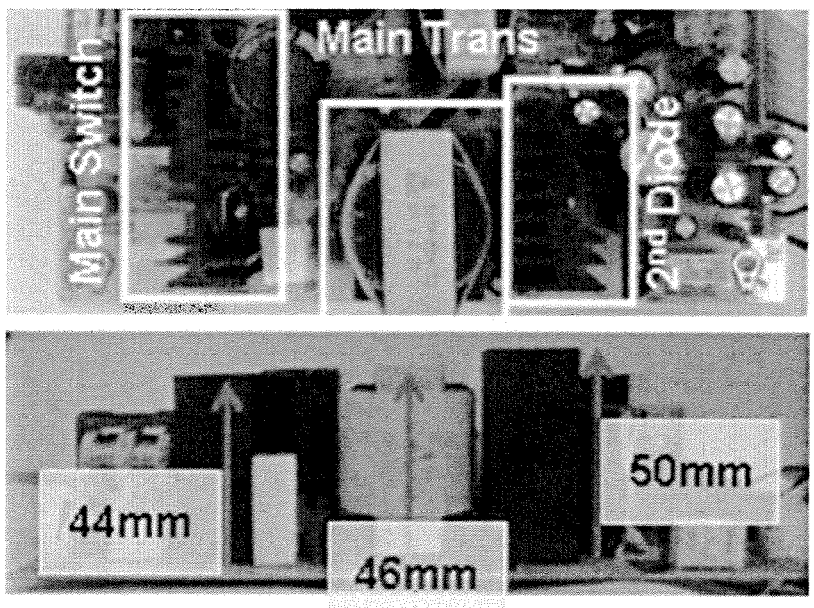
FIG. 10a and FIG. 10b are each of practically implemented photographs for the conventional fly-back converter and the LLC resonant converter in accordance with the present invention.
Figure 10B:
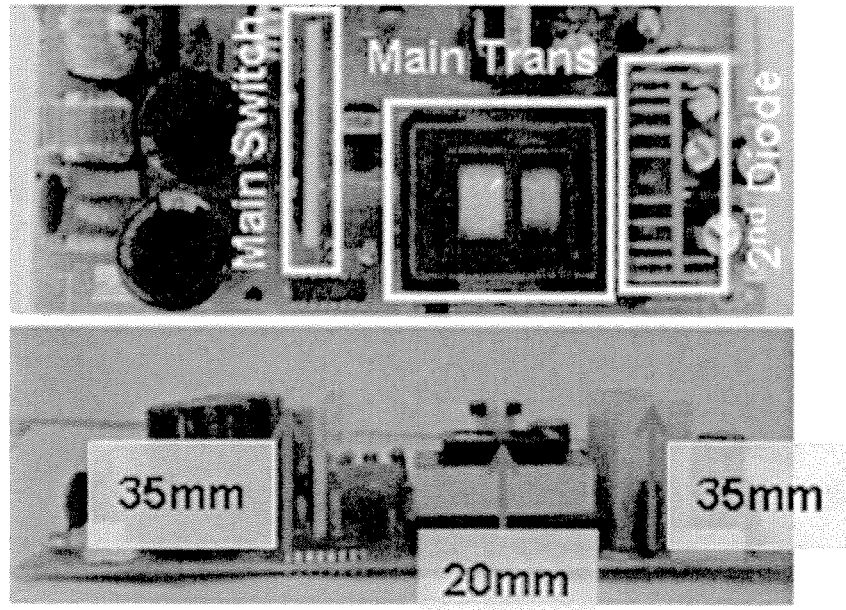
Figure 11A:
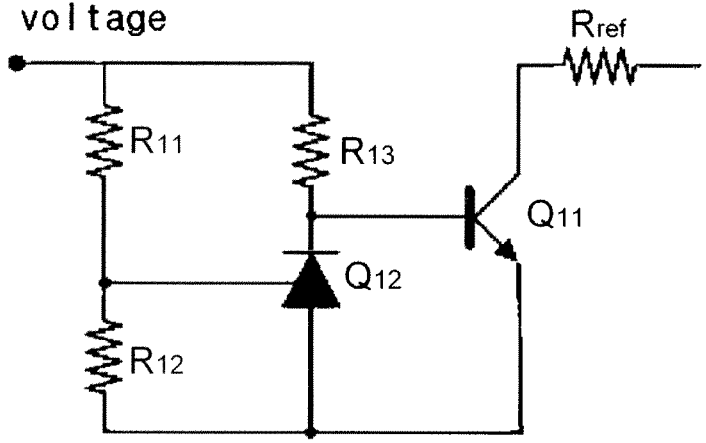
FIG. 11a to FIG. 11c are exemplary circuit diagrams implementing variable resistors of the minimum switching frequency variable circuit.
Figure 11B:
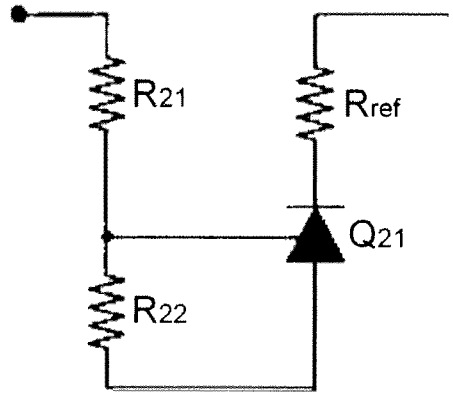
Figure 11C:
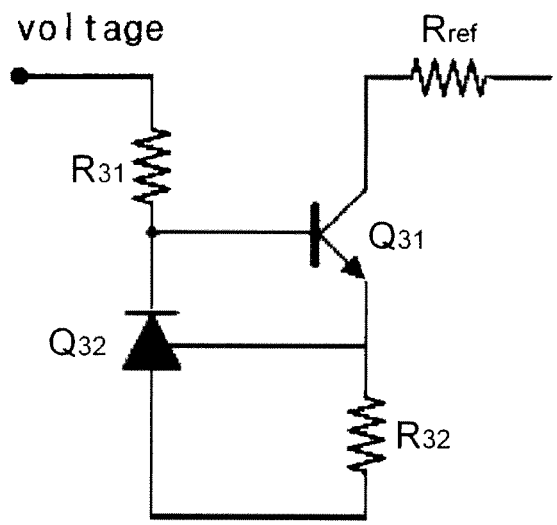

FIG. 3 is a diagram showing one example of an LLC resonant converter in accordance with one embodiment of the present invention. FIG. 4 is a diagram showing main operational waveforms at the circuit of FIG. 3, FIG. 5 is a diagram showing one example of a control circuit of the LLC resonant converter in accordance with the embodiment of the present invention. FIG. 6a and FIG. 6b are diagrams showing voltage waveforms of switching capacitor ($C_{OSC}$) of the LLC resonant converter of FIG. 5, each of when AC input voltages of the LLC resonant converter are low and high, and waveforms of a pulse signal (Output A) generated at a first pulse signal generating unit and a second pulse signal (Output B) generated at a second pulse signal generating unit. FIG. 7 is a diagram showing a DC voltage gain curve according to a switching frequency when an AC input voltage of the LLC resonant converter is high (e.g., 390V). FIG. 8 is a diagram showing a DC voltage gain curve according to a switching frequency when an AC input voltage of the LLC resonant converter is low (e.g., 300V). FIG. 9 is a diagram showing output characteristics of a minimum switching frequency adjustable transistor according to a minimum switching frequency adjustable transistor base current of the LLC resonant converter, FIG. 10a and FIG. 10b are each of practically implemented photographs for the conventional fly-back converter and the LLC resonant converter in accordance with the present invention and FIG. 11a to FIG. 11c are exemplary circuit diagrams implementing variable resistors of the minimum switching frequency variable circuit. Hereinafter, with reference to FIG. 3 to FIG. 11, the present invention will be explained.

Referring to FIG. 3, the LLC resonant converter in accordance with the present invention includes a first switching transistor Q1, a second switching transistor Q2, a plurality of resonant units Cr, Lr and Lm, a transforming unit 10, a plurality of rectifying units $d_1$, $d_2$ and $C_O$ and a control circuit (shown in FIG. 5) of the LLC resonant converter. Herein, the $R_L$ is a load resistor. Since such LLC resonant converter is published in KR published patent No. 2006-0014102, detailed explanation thereof will be omitted and, in the present invention, portions to have differences from the conventional LLC resonant converter will be intensively explained.

As the LLC resonant converter in accordance with the present invention is a converter without an active power factor improvement circuit, it can be stably operate under the peak load condition by controlling a minimum switching frequency Fmin of the resonant unit according to an AC input voltage.

Referring to FIG. 5 and FIG. 6, the control circuit of the LLC resonant circuit includes a minimum switching frequency variable circuit of varying a minimum switching frequency corresponding to an AC input voltage of the LLC resonant converter and a first pulse signal generating unit and a second pulse signal generating unit to generate a first pulse signal and a second pulse signal based on a switching frequency limited by the minimum switching frequency variable circuit. The first pulse signal generating unit and the second pulse signal generating unit are constructions which are arranged inside of a resonant IC of FIG. 5. Herein, as an OSC Charge and an OSC RC are terminals of the resonant IC, the resonant IC generates a resonant waveform by using these terminals.

Herein, the minimum switching frequency variable circuit includes a minimum switching frequency adjustable transistor Qr to operate corresponding to an AC input voltage of the LLC resonant converter, and a time constant of the minimum switching frequency variable circuit is varied according to an operation of the minimum switching frequency adjustable transistor Qr together with a switching capacitor $C_{OSC}$ and a switching resistor $R_{OSC}$. As is well known, the time constant of the resonant circuit of R and C is RC.

As shown in FIG. 5, a reference resistor $R_{ref}$ is connected to the minimum switching frequency adjustable transistor Qr in series, the switching resistor $R_{OSC}$ is connected to the minimum switching frequency adjustable transistor Qr and the reference resistor $R_{ref}$ in parallel, and the switching capacitor $C_{OSC}$ also connected to the switching resistor $R_{OSC}$ in parallel.

At this time, corresponding to the AC input voltage of the LLC resonant converter, when the minimum switching frequency adjustable transistor Qr is ON, that is, when the AC input voltage of the LLC resonant converter is relatively high in comparison with an operation start voltage of the minimum switching frequency adjustable transistor Qr, since the resonance is generated due to the $[(R_{ref}+R_{trans})//R_{OSC}]$, the time constant for this case become $$[(R_{ref} + R_{trans}) // R_{osc}]C_{osc} = \frac{(R_{ref} + R_{trans})R_{osc}}{R_{ref} + R_{trans} + R_{osc}}C_{osc}.$$

On the other hands, corresponding to an AC input voltage of the LLC resonant converter, when the minimum switching frequency adjustable transistor is OFF, that is, when the AC input voltage of the LLC resonant converter is relatively low in comparison with an operation start voltage of the minimum switching frequency adjustable transistor Qr, since the resonance is generated due to the $R_{OSC}$ and the $C_{OSC}$, the time constant for this case become $$R_{OSC}C_{OS}.$$

Herein, the Rref is a resistance value of the reference resistor Rref, the Rtrans is a resistance value of an equivalent resistor of the minimum switching frequency adjustable transistor Qr during the operation of the minimum switching frequency adjustable transistor Qr, the $R_{OSC}$ is a resistance value of the switching resistor $R_{OSC}$, and the $C_{OSC}$ is a capacitance of the switching capacitor $C_{OSC}$.

As shown in FIG. 6, according to varying the AC input voltage, the time constant is changed, in this result, the minimum switching frequency can be adjusted by changing the timing to be discharged at the $C_{OSC}$. Comparing to FIG. 6a and FIG. 6b, when the case of FIG. 6b is applied with an AC input voltage higher than the case shown in FIG. 6a, as the first pulse signal and the second pulse signal are shown, it is confirmed that the minimum switching frequency has a frequency higher in comparison with FIG. 6a. By varying the switching frequency like this, a DC gain of the LLC resonant converter of the present invention can be adjusted.

Like this, the first pulse signal (Output A of FIG. 6a and FIG. 6b) and the second pulse signal (Output B of FIG. 6a and FIG. 6b) can be applied to each of the gate terminals of the first switching transistor Q1 and the second switching transistor Q2.

Herein, the minimum switching frequency variable circuit includes a first input resistor (R1 of FIG. 5) and a second input resistor (R2 of FIG. 5), the AC input voltage of the LLC resonant converter is voltage divided by the first input resistor R1 and the second input resistor R2 and can be applied to the base terminal of the minimum switching frequency adjustable transistor Qr.

In this case, in order to input current into the base terminal of the minimum switching frequency adjustable transistor Qr, it is preferable that a third input resistor is additionally added at a front end of the base terminal.

And also, it is preferable that the first pulse signal generating unit and the second pulse signal generating unit set a predetermined dead time ($t_{OS}$ of FIG. 6a and FIG. 6b) between the first pulse signal and the second pulse signal not to make the first pulse signal and the second pulse signal to be high signals at the same time.

As described above, the first pulse signal (Output A of FIG. 6a an FIG. 6b) and the second pulse signal (Output B of FIG.

6a and FIG. 6b) generated at the first pulse signal generating unit and the second pulse generating unit are applied to the gate terminal of the first switching transistor Q1 and the second switching transistor Q2 of FIG. 3. In FIG. 4, it is noted that the $V_{GS}(Q1)$ and $V_{GS}(Q2)$ are equal to the waveform of the Output A of FIG. 6a and FIG. 6b and the waveform of the Output B of FIG. 6a and FIG. 6b. Also, the period of the predetermined dead time is represented at the bottom of FIG. 4 as S1 and S4.

According to the change of the AC input voltage, as shown in FIG. 7 and FIG. 8, an optimum LLC resonant converter adapted for a corresponding system can be designed by linearly controlling the switching frequency with matching to the input/output DC voltage gain of the LLC block.

Although, in the above, there is exemplarily explained the case the minimum switching frequency variable circuit is implemented by using the minimum switching frequency adjustable transistor Qr, the time constant of the minimum switching frequency variable transistor can be also changed by including a variable resistor to be varied corresponding to the AC input voltage of the LLC resonant converter and a switching capacitor except the minimum switching frequency adjustable transistor Qr. Finally, since the minimum switching frequency adjustable transistor Qr also a variable resistor dependent on a base current corresponding to the AC input voltage when it is viewed at the side of the resonant IC of FIG. 5.

FIG. 11a to FIG. 11c are exemplary circuit diagrams implementing variable resistors of the minimum switching frequency variable circuit. Referring to FIG. 11a, as the $Q_{12}$ is a shunt regulator, it is conducted when a reference terminal is higher than 2.5V, but it is not conducted when the reference terminal is not higher than 2.5V. According to the AC input voltage, the reference terminal voltage of the $Q_{12}$ is changed, and the $Q_{12}$ is conducted and $Q_{11}$ becomes ON when the AC input voltage is high, it can play a role of a variable resistor when being view at the side of $R_{ref}$. Referring to FIG. 11b, according to the AC input voltage, the reference terminal voltage of the $Q_{21}$ is changed, and the $Q_{21}$ is conducted when the AC input voltage is high, it can play a role of a variable resistor when being view at the side of $R_{ref}$. Similar to FIG. 11c, by controlling the operation of the $Q_{31}$ according to the conduction of the $Q_{32}$, it can play a role of the variable resistor when being view at the side of $R_{ref}$. Like these, the examples of three type variable resistors are only simple examples; it can be variously changed and modified by the ordinarily skilled in the art.

As shown in FIG. 7 and FIG. 8, although the switching frequency points having the same input/output DC voltage gain exist two (except the peak point), in view of the circuit design, there is need to be limited so as to be designed in the period maintaining the linearity.

As shown in FIG. 7, when the AC input voltage is 390V, that is, under the high input voltage condition, in order to obtain 1.3 times of voltage gain, the switching frequency must be operated as the operational switching frequency of 103 kHz or 53 kHz. In this case, the limitation of the minimum operational switching frequency must be defined based on the margin with reference to the frequency without departing from the resonance region; and also, it should be set based the minimum switching frequency of the low AC input condition. Accordingly, it is preferable that at the side 103 kHz between the above operational frequencies 103 kHz or 53 kHz be designed.

Although under the high input voltage condition the minimum switching frequency is 70 kHz enough to have sufficient margin, but it has the operational switching frequency departed when viewing the resonant region at the low AC input. That is, referring to FIG. 8, if the minimum switching frequency is set as 70 kHz, it can be conformed that the linearity is not represented according to the load condition.

Accordingly, the optimum design is difficult in the case that the variable range of the AC input voltage is wide, because the minimum switching frequency is selected to satisfy all the worst voltage input and the DC voltage gain.

In conclusion, in accordance with the present invention, it can be designed to be operated as the optimum LLC resonant converter since the minimum switching frequency range is linearly varied according to the AC input voltage by varying the resistor related to the frequency of the resonant IC.

Also, when the characteristics to drop the output voltage according to the load is implemented at the system having the load characteristic of the instant peak current, it is easily implemented by applying the circuit in accordance with the present invention. That is, if the peak loads are generated at the amp terminals of the audio system, the stress can be generated due to the instant overload, in this case, the stress can be reduced by dropping the output voltage by applying the LLC resonant converter in accordance with the present invention.

Referring to FIG. 9, viewing at the aspect of circuit, if the base current Ib of the minimum switching frequency adjustable transistor Qr is flown according to the high AC input voltage, the collector current Ic proportional to the value flows (that is, the minimum switching frequency adjustable transistor Qr can play the role such as a current controlled current source), the operating minimum switching frequency can be adjustable while the charges charged at the switching capacitor $C_{OSC}$ are discharged to the switching resistor $R_{OSC}$ and the collector current $I_C$ of the minimum switching frequency adjustable transistor Qr. Accordingly, the minimum switching frequency is controlled by changing the timing to be discharged by adjusting the resistor of the terminal related to the resonant IC of the LLC resonant converter.

Particularly viewing the transistor in which the base current flows according to the AC input voltage (assuming that the reference resistor is 100 KΩ), when 0.5 of the base current Ib flows, the collector current $I_C$ is 0.5×β (assuming that 50)=25, accordingly Vce=5V−Ic×Rref (assuming that 100 100 KΩ)=2.5V. This is shown as the Q1 in FIG. 9. Herein, the voltage of the collector terminal is assumed as 5V.

Thereafter, when the 0.6 of the base current 1b flows, the collector current $I_C$ is 0.6×β (assuming that 50)=30, accordingly Vce=5V−Ic×Rref=2V. This is shown as the Q2 in FIG. 9.

Thereafter, when the 0.7 of the base current 1b flows, the collector current $I_C$ is 0.7×β (assuming that 50)=35, accordingly Vce=5V−Ic×Rref=1.5V. This is shown as the Q3 in FIG. 9.

As being noted from the above specific formula, the vase current is changed according to the AC input voltage, and the charges charged the switching capacitor $C_{OSC}$ is discharged through the minimum switching frequency adjustable transistor Qr by varying the collector current according to the changed amount, thereby identifying again the varied amount that the minimum switching frequency.

When applying the LLC resonant converter in accordance with the present invention, as can be identified from FIG. 10a and FIG. 10B, the slim design can be available.

Accordingly, in accordance with the present invention, a control circuit of an LLC resonant converter capable of obtaining a desired input/output DC voltage gain with corresponding to a variable AC input voltage and varying a minimum switching frequency without an active power factor correction and an LLC resonant converter using the same can be provided.

Particularly, for the country without the restriction for the power factor or the products without applying the restriction for the power factor even in the same country, the power supply system can be applied without the active power factor improvement circuit, and, in such case, the control circuit of the LLC resonant converter in accordance with the present invention and the LLC resonant converter using the same can be applied.

And also, even in the peak load condition, since the operations of the zero voltage switching (ZVS) and the zero current switching (ZCS) are allowable, the switching loss generated at the conventional converter can be prevented; and, accordingly, the miniaturization of heat sink (H/S) and transformer can be allowable to thereby achieve the slim of the power supply system.

And also, if the peak loads are generated at the amp terminals of the audio system, the stress can be generated due to the instant overload, in this case, the stress can be reduced by dropping the output voltage by applying the LLC resonant converter in accordance with the present invention.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A control circuit of an LLC resonant converter comprising:
    a minimum switching frequency variable circuit for varying a minimum switching frequency by varying a time constant of a switching frequency variable circuit corresponding to an AC input voltage of the LLC resonant converter; and
    a first pulse signal generating unit and a second pulse signal generating unit to generate a first pulse signal and a second pulse signal based on a switching frequency limited by the minimum switching frequency variable circuit.

2. The control circuit of the LLC resonant converter according to claim 1, wherein the minimum switching frequency variable circuit comprises a minimum switching frequency adjustable transistor to operate corresponding to an AC input voltage of the LLC resonant converter; and
    the time constant of the minimum switching frequency variable circuit is varied according to an operation of the minimum switching frequency adjustable transistor together with a switching capacitor and a switching resistor.

3. The control circuit of the LLC resonant converter according to claim 2, wherein the minimum switching frequency variable circuit comprising:
    the minimum switching frequency adjustable transistor;
    a reference resistor connected to the minimum switching frequency adjustable transistor in series;
    a switching resistor connected to the minimum switching frequency adjustable transistor and the reference resistor in parallel; and
    a switching capacitor connected to the switching resistor in parallel.

4. The control circuit of the LLC resonant converter according to claim 3, wherein. corresponding to the AC input voltage of the LLC resonant converter, when the minimum switching frequency adjustable transistor Or is ON, the time constant becomes $$[(R_{ref} + R_{trans}) // R_{osc}]C_{osc} = \frac{(R_{ref} + R_{trans})R_{osc}}{R_{ref} + R_{trans} + R_{osc}}C_{osc},$$

corresponding to an AC input voltage of the LLC resonant converter, when the minimum switching frequency adjustable transistor is OFF, the time constant become $R_{OSC}C_{OSC}$, and
    wherein the Rref is a resistance value of the reference resistor Rref, the Rtrans is a resistance value of an equivalent resistor of the minimum switching frequency adjustable transistor Qr during the operation of the minimum switching frequency adjustable transistor Qr, the $R_{OSC}$ is a resistance value of the switching resistor $R_{OSC}$, and the $C_{OSC}$ is a capacitance of the switching capacitor $C_{OSC}$.

5. The control circuit of the LLC resonant converter according to claim 2, wherein the minimum switching frequency adjustable transistor comprises a first input resistor and a second input resistor; and
    an AC input voltage of the LLC resonant converter is voltage dropped by the first input resistor and the second input resistor and applied to a base terminal of the minimum switching frequency adjustable transistor.

6. The control circuit of the LLC resonant converter according to claim 2, wherein the first pulse signal generating unit and the second pulse signal generating unit generate the first pulse signal and the second pulse signal, alternately.

7. The control circuit of the LLC resonant converter according to claim 6, wherein the first pulse signal generating unit and the second pulse signal generating unit set a dead time between the first pulse signal and the second pulse signal not to allow the first pulse signal and the second pulse signal to become high at the same time.

8. The control circuit of the LLC resonant converter according to claim 5, wherein the minimum switching frequency variable circuit further comprises a third input resistor provided with one end located between the first input resistor and the second input resistor and the other end connected to a base terminal of the minimum switching frequency adjustable transistor.

9. The control circuit of the LLC resonant converter according to claim 1, wherein the minimum switching frequency variable circuit comprises a switching capacitor and a variable resistor for varying corresponding to an AC input voltage of the LLC resonant converter to vary the time constant of the minimum switching frequency variable circuit.

10. An LLC resonant converter provided with a first switching transistor, a second switching transistor, a transforming unit, a rectifying unit and a control circuit of the LLC resonant converter, comprising:
    the control circuit of the LLC resonant converter comprises a minimum switching frequency variable circuit for varying a minimum switching frequency by varying a time constant of a switching frequency variable circuit corresponding to an AC input voltage of the LLC resonant converter; and a first pulse signal generating unit and a second pulse signal generating unit to generate a first pulse signal and a second pulse signal based on a switching frequency limited by the minimum switching, frequency variable circuit, wherein the first pulse signal and the second pulse signal are applied to the first switching transistor and the second switching transistor.

11. The LLC resonant convener according to claim 10, wherein the first pulse signal and the second pulse signal are applied to a gate terminal of the first switching transistor and a gate terminal of the second switching transistor.

12. The LLC resonant converter according to claim 10, wherein the minimum switching frequency variable circuit includes a minimum switching frequency adjustable transistor to operate corresponding to an AC input voltage of the LLC resonant converter; and the time constant of the minimum switching frequency variable circuit is varied according to an operation of the minimum switching frequency adjustable transistor together with a switching capacitor and a switching resistor.

13. The LLC resonant converter according to claim 12, wherein the minimum switching frequency variable circuit comprising:

the minimum switching frequency adjustable transistor;
a reference resistor connected to the minimum switching frequency adjustable transistor in series
a switching resistor connected to the minimum switching frequency adjustable transistor and the reference resistor in parallel; and
a switching capacitor connected to the switching resistor in parallel.

14. The LLC resonant converter according to claim 13, wherein, corresponding to the AC input voltage of the LLC resonant converter, when the minimum switching, frequency adjustable transistor Qr is ON, the time constant becomes $$[(R_{ref} + R_{trans}) // R_{osc}]C_{osc} = \frac{(R_{ref} + R_{trans})R_{osc}}{R_{ref} + R_{trans} + R_{osc}}C_{osc},$$

corresponding to an AC input voltage of the LLC resonant converter. when the minimum switching frequency adjustable transistor is OFF, the time constant become $R_{OSC}C_{OSC}$, and wherein the Rref is a resistance value of the reference resistor Rref, the Rtrans is a resistance value of an equivalent resistor of the minimum switching frequency adjustable transistor Qr during the operation of the minimum switching frequency adjustable transistor Qr, the $R_{OSC}$ is a resistance value of the switching resistor $R_{OSC}$, and the $C_{OSC}$ is a capacitance of the switching capacitor $C_{OSC}$.

15. The LLC resonant converter according to claim 12, wherein the minimum switching frequency adjustable transistor comprises a first input resistor and a second input resistor; and an AC input voltage of the LLC resonant converter is voltage dropped by the first input resistor and the second input resistor and applied to a base terminal of the minimum switching frequency adjustable transistor.

16. The LLC resonant converter according to claim 12, wherein the first puke signal generating unit and the second pulse signal generating unit generate the first pulse signal and the second pulse signal, alternately.

17. The LLC resonant converter according to claim 16, wherein the first pulse signal generating unit and the second pulse signal generating unit set a dead time between the first pulse signal and the second pulse signal not to allow the first pulse signal and the second pulse signal to become high at the same time.

18. The LLC resonant converter according to claim 15, wherein the minimum switching frequency variable circuit further comprises a third input resistor provided with one end located between the first input resistor and the second input resistor and the other end connected to a base terminal of the minimum switching frequency adjustable transistor.

19. The LLC resonant converter according to claim 10, wherein the minimum switching frequency variable circuit comprises a switching capacitor and a variable resistor for varying corresponding to an AC input voltage of the LLC resonant converter to vary the time constant of the minimum switching frequency variable circuit.

* * * * *